(12) United States Patent
Liang et al.

(10) Patent No.: US 9,971,065 B2
(45) Date of Patent: May 15, 2018

(54) ANTI-REFLECTION GLASS MADE FROM SOL MADE BY BLENDING TRI-ALKOXYSILANE AND TETRA-ALKOXYSILANE INCLUSIVE SOLS

(71) Applicant: Guardian Industries Corp., Auburn Hills, MI (US)

(72) Inventors: Liang Liang, Taylor, MI (US); Richard Blacker, Farmington Hills, MI (US); Nikhil D. Kalyankar, Mountain View, CA (US); Scott Jewhurst, Redwood City, CA (US)

(73) Assignee: Gaurdian Glass, LLC, Auburn Hills, MI (US)

( * ) Notice: Subject to any disclaimer, the term of this patent is extended or adjusted under 35 U.S.C. 154(b) by 0 days. days.

(21) Appl. No.: 13/826,288

(22) Filed: Mar. 14, 2013

(65) Prior Publication Data
US 2014/0272126 A1 Sep. 18, 2014

(51) Int. Cl.
*G02B 1/111* (2015.01)
*C03C 17/245* (2006.01)

(52) U.S. Cl.
CPC ............ *G02B 1/111* (2013.01); *C03C 17/245* (2013.01); *C03C 2217/732* (2013.01); *C03C 2218/113* (2013.01)

(58) Field of Classification Search
CPC .... B05D 5/06; B05D 1/18; B05D 1/02; C03C 17/25; C03C 17/00; G02B 1/11; G02B 1/111
USPC .................................................. 427/160–169
See application file for complete search history.

(56) References Cited

U.S. PATENT DOCUMENTS

| 4,024,306 | A | 5/1977 | Takamizawa et al. |
| 4,408,009 | A | 10/1983 | Mallon |
| 4,652,467 | A | 3/1987 | Brinker et al. |
| 5,394,269 | A | * | 2/1995 | Takamatsu et al. .......... 359/580 |
| 6,387,517 | B1 | 5/2002 | Belleville et al. |

(Continued)

FOREIGN PATENT DOCUMENTS

| EP | 2 036 868 | 3/2009 |
| EP | 2 738 145 | 6/2014 |
| WO | WO 2013/055951 | 4/2013 |

OTHER PUBLICATIONS

U.S. Appl. No. 13/826,011, filed Mar. 14, 2013; Liang et al.
U.S. Appl. No. 13/826,288, filed Mar. 14, 2013; Liang et al.
U.S. Appl. No. 13/273,007, filed Oct. 13, 2011; Kalyankar et al.

*Primary Examiner* — Elizabeth A Burkhart
(74) *Attorney, Agent, or Firm* — Dority & Manning, P.A.

(57) ABSTRACT

Anti-reflection (AR) coating for a glass substrate is prepared by blending at least two different sols to form a coating sol which is used to coat a substrate such as a transparent glass substrate. In certain example embodiments, a method includes forming a first sol formulation including a colloidal solution having a tri-alkoxysilane based binder; forming a second sol formulation including a colloidal solution having a tetra-alkoxysilane based binder; blending the first and second sol formulations to form a coating sol formulation; coating at least a portion of said coating sol formulation onto the glass substrate to form a coating; and heating (e.g., for curing and/or annealing) the glass substrate and the coating thereon. Anti-reflection glasses show improved mechanical strength and higher transmittances (e.g., Tqe % gain).

29 Claims, 11 Drawing Sheets

Imaginary network made from sol with cyclohexyltrimethoxysilane (A) and tetraethyl orthosilicate (B).

(56) References Cited

U.S. PATENT DOCUMENTS

| | | |
|---|---|---|
| 2004/0121451 A1 | 6/2004 | Moritz et al. |
| 2005/0266208 A1 | 12/2005 | Raychaudhuri et al. |
| 2006/0167147 A1 | 7/2006 | Asgari |
| 2009/0244709 A1 | 10/2009 | Suzuki et al. |
| 2010/0165467 A1 | 7/2010 | Thies |
| 2010/0227159 A1* | 9/2010 | Kumon et al. ............... 428/336 |
| 2011/0008236 A1 | 1/2011 | Hinman et al. |
| 2011/0151260 A1 | 6/2011 | Okubo et al. |
| 2011/0201735 A1 | 8/2011 | Arpac et al. |
| 2012/0040179 A1 | 2/2012 | Dave |
| 2013/0034653 A1 | 2/2013 | Kumar et al. |
| 2013/0034722 A1* | 2/2013 | Kalyankar et al. ........ 428/317.5 |
| 2013/0095237 A1* | 4/2013 | Kalyankar et al. ........... 427/161 |
| 2014/0272125 A1 | 9/2014 | Liang et al. |
| 2014/0272126 A1 | 9/2014 | Liang et al. |

* cited by examiner

Figure 1. Hydrolysis of tetraethyl orthosilicate with acid as a catalyst.

Figure 2. Hydrolysis of cyclohexyltrimethoxysilane with acid as a catalyst.

Figure 3. Electronic status around silicone atom in cyclohexyltrimethoxysilane and tetraethyl orthosilicate.

Figure 4. Condensation of hydrolyzed tetraethyl orthosilicate with acid as catalyst.

Figure 5. Condensation of hydrolyzed cyclohexyltrimethoxysilane with acid as a catalyst.

Figure 6. Formation of nanoparticle from cyclic siloxane by condensation.

Figure 7. Imaginary network made from sol with cyclohexyltrimethoxysilane (A) and tetraethyl orthosilicate (B).

Relationship between refractive index and thickness of anti-reflection thin film (A: anti reflection solar float glass; B: anti reflection matte matte glass).

Figure 9. Transmittance spectra of anti-reflection matte matte glass from blended sols (Tqe% of raw matte matte glass is included as the bottom plot for reference and the labels are those in Table 5).

Figure 10. Transmittance of anti-reflection solar float glass from blended first and second sols (Tqe% of raw solar float glass is included as the bottom plot for reference).

Effect of tetraethyl orthosilicate (wt.%) in blended binders on thickness and refractive index of anti-reflection solar float thin film.

ANTI-REFLECTION GLASS MADE FROM SOL MADE BY BLENDING TRI-ALKOXYSILANE AND TETRA-ALKOXYSILANE INCLUSIVE SOLS

Certain embodiments of this invention relate to antireflective (AR) coatings, and coated glass substrates having such AR coatings thereon, that provide low reflectivity and a higher percent of light transmission over a broad range of light wavelengths (e.g., including visible wavelengths) when used to manufacture semiconductor devices, solar cells, energy cells or other glass products. In particular, a new type of coating for use in pattern glass, such as matte-matte, matte prismatic matte and solar float anti-reflection glass products is provided that can improve the mechanical strength of the glass while providing a high level of light transmission.

BACKGROUND AND SUMMARY OF THE INVENTION

Coatings that provide low reflectivity and/or a high percent transmission over a broad wavelength range of light are desirable in many applications including solar cells, windows, and the like. Light transmission through material causes the wavelength of the light to change, a process known as refraction, while the frequency remains unchanged thus changing the speed of light in the material. Antireflective (AR) coatings are typically applied to the surface of a transparent substrate to reduce reflectance of visible light from the article and improve transmission of such light through the substrate.

Sol-gel based antireflective (AR) coatings using alkyltrialkoxysilane binders having low refractive index are described in U.S. Ser. No. 13/273,007, filed Oct. 13, 2011, the disclosure of which is hereby incorporated herein by reference. For example, the '007 application discloses coating a substrate with a sol-formulation comprising an alkyltrialkoxysilane-based binder having the formula (I):

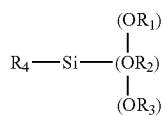

where $R_1$, $R_2$, and $R_3$ are the same or different and each represents an alkyl group containing 1 to 20 carbon atoms, an aryl group containing 6 to 20 carbon atoms, or an aralkyl group containing 7 to 20 carbon atoms, wherein $R_4$ represents an alkyl group containing 1 to 20 carbon atoms, an aryl group containing 6 to 20 carbon atoms, an aralkyl group containing 7 to 20 carbon atoms, or a fluoro-modified alkyl group containing 1 to 20 carbon atoms, and silica based nanoparticles, wherein a mass ratio of the alkyltrialkoxysilane-based binder to the silica based nanoparticles is between 0.1:1 to 20:1. The sol-gel formulation also includes an alcohol containing solvent and an acid or base containing catalyst, in addition to the alkyltrialkoxysilane-based binder. After a glass substrate is coated with the sol gel, the coated glass substrate is annealed.

The term "binder" as used herein refers to a component used to bind together one or more types of materials in mixtures. The principal properties of a binder are adhesion and/or cohesion. The term "sol-formulation" as used herein is a chemical solution comprising at least a silane-inclusive and/or silane-based binder and silica inclusive and/or silica-based nanoparticles. The term "sol-gel process" as used herein is a process where a wet formulation (the "sol") is dried to form a gel coating having both liquid and solid characteristics. The gel coating is then heat treated to form a solid material. This technique is valuable for the development of coatings because it is easy to implement and provides films of substantially uniform composition and thickness.

The AR coatings in the '007 application thus relate to a wet chemical film deposition process using a specific sol-formulation including a alkyltrialkoxysilane-based binder and silica based nanoparticles to produce porous anti-reflective coatings with a low refractive index (e.g., lower than glass). The sol-formulation in the '007 application may be prepared by mixing the alkyltrialkoxysilane-based binder, silica based nanoparticles, an acid or base containing catalyst, water, and a solvent system. The sol-formulation may be formed by at least one of a hydrolysis and polycondensation reaction. The sol-formulation may be stirred at room temperature or at an elevated temperature (e.g., 50-60 degrees Celsius) until the sol-formulation is substantially in equilibrium (e.g., for a period of 24 hours). The sol-formulation may then be cooled.

A transparent glass substrate is coated with the sol-formulation. The coating on the substrate is then dried to form a gel. A gel is a coating that has both liquid and solid characteristics and may exhibit an organized material structure. During the drying, solvent of the sol-formulation is evaporated and further bonds between the components, or precursor molecules, may be formed. The drying may be performed by exposing the coating on the substrate to the atmosphere at room temperature or a heated environment. The gel is then annealed to form the porous coating. E.g., the annealing temperature may be in the range of 300-1,000 degrees C.

Unfortunately, it has been found that the AR coating of the '007 application (described above) is lacking with respect to durability. Thus, it will be appreciated that there exists a need in the art for a more durable AR coating.

In certain example embodiments of this invention, there is provided a method of making a coated article including an anti-reflection coating on a glass substrate, the method comprising: forming a first sol formulation comprising a colloidal solution including a tri-alkoxysilane based binder; forming a second sol formulation comprising a colloidal solution including a tetra-alkoxysilane based binder; blending the first and second sol formulations to form a coating sol formulation; coating at least a portion of said coating sol formulation onto the glass substrate to form a coating; and heating said glass substrate and said coating. It has surprisingly and unexpectedly been found that this technique results in a more durable coating than the coating of the '007 application.

DETAILED DESCRIPTION OF EXAMPLE EMBODIMENTS OF THE INVENTION

Figure 1:
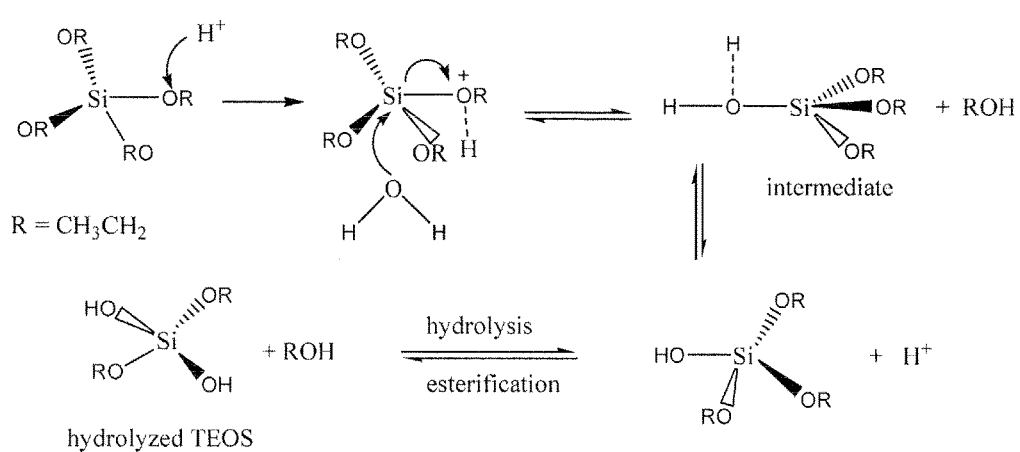
FIG. 1 is a graphic depiction of the chemical reaction showing the hydrolysis of tetraethyl orthosilicate (TEOS) with acid as a catalyst.

As summarized above, it has been found that producing anti-reflection glass using a sol coating with blended sols having binders of tri-alkoxysilane and tetra-alkoxysilane can result in a sol having improved physical properties as compared to either composition alone and ultimately provide an improved anti-reflective glass product with high levels of light transmittance. Certain embodiments of this invention include anti-reflection glass products made from sols having different amounts of tetraethyl orthosilicate in mixed binders of cyclohexyltrimethoxysilane and tetraethyl orthosilicate. When tested and evaluated as discussed below, the resulting anti-reflection glass products have improved mechanical strength and durability, as well as better optical performance as indicated by higher levels of transmittance (Tqe % gain) in broadband.

In certain example embodiments of this invention, there is provided a method of making a coated article including an anti-reflection coating on a glass substrate, the method comprising: forming a first sol formulation comprising a colloidal solution including a tri-alkoxysilane based binder; forming a second sol formulation comprising a colloidal solution including a tetra-alkoxysilane based binder; blending the first and second sol formulations to form a coating sol formulation; coating at least a portion of said coating sol formulation onto the glass substrate to form a coating; and heating said glass substrate and said coating.

First Sol Formulation

The alkyltrialkoxysilane-based binder in the first sol formulation may be represented by the general formula (I) shown above in the background section. Exemplary alkyl groups containing 1 to 20 carbon atoms may be selected from the group consisting of: n-butyl, isobutyl, n-pentyl, isopentyl, n-hexyl, isohexyl, cyclohexyl, n-heptyl, methoylcyclohexyl, octyl, ethylcyclohexyl, and the like. Exemplary aryl groups containing 6 to 20 carbon atoms may be selected from the group consisting of: phenyl, benzyl, xylyl, and the like. Exemplary fluoro-modified alkyl groups containing 1 to 20 carbon atoms may be selected from the group consisting of: fluoromethyl, fluoroethyl, fluorohexyl, and the like. Exemplary alkyltrialkoxysilane-based binders for the first sol formulation may be selected from the group consisting of n-propyltriethoxysilane, n-pentyltriethoxysilane, n-hexyltriethoxysilane, cyclohexyltrimethoxysilane (CTMS), methyltriethoxysilane (MTES), methyltrimethoxysilane (MTMS), glycidoxipropyltrimethoxysilane (Glymo), N-butyltrimethoxysilane, aminoethyltrimethoxysilane, trimethoxysilane, triethoxysilane, vinyltrimethoxysilane, propyltriethoxysilane (PTES), ethyltriethoxysilane (ETES), n-butyltriethoxysilane (BTES), methylpropoxysilane, and combinations thereof. In certain embodiments, the alkyltrialkoxysilane-based binder may be used with other binders in the first sol formulation.

The first sol formulation includes silica based nanoparticles, wherein a mass ratio of the alkyltrialkoxysilane-based binder to the silica based nanoparticles in the first sol formulation may be between 0.1:1 to 20:1, and the alkyltrialkoxysilane-based binder may comprise from about 10 wt. % to about 80 wt. % ash contribution in the total ash content of the first sol-formulation.

For example, the first sol formulation may include from about 0.1 wt. % to about 50 wt. % of alkyltrialkoxysilane-based binder; from about 0.1 wt. % to about 15 wt. % of silica-based nanoparticles; from about 50 wt. % to about 95 wt. % of an alcohol containing solvent; and from about 0.001 wt. % to about 0.1 wt. % of an acid or base containing catalyst. For example, the first sol formulation may be any of the sol formulations described above in the '007 application mentioned above in the background section of this specification, which application is incorporated herein by reference. In the first sol formulation, for example, the alkyltrialkoxysilane-based binder may be ETES, CTMS, BTES, and/or PTES, and the alcohol containing solvent may be of or include n-propyl alcohol, and the acid or base containing catalyst may be of or include acetic acid and/or nitric acid.

The amount of alkyltrialkoxysilane-based binder in the first sol formulation may comprise at least 0.1 wt. %, 1 wt. %, 5 wt. %, 7 wt. %, 9 wt. %, 10 wt. %, 12 wt. %, 15 wt. %, 20 wt. %, 25 wt. %, 30 wt. %, 35 wt. %, 40 wt. %, or 45 wt. % of the total weight of the first sol formulation. The amount of alkyltrialkoxysilane-based binder in the sol-formulation may comprise up to 1 wt. %, 5 wt. %, 7 wt. %, 9 wt. %, 10 wt. %, 12 wt. %, 15 wt. %, 20 wt. %, 25 wt. %, 30 wt. %, 35 wt. %, 40 wt. %, or 45 wt. % or 50 wt. % of the total weight of the sol-formulation. The amount of the alkyltrialkoxysilane-based binder in the first sol formulation may be present in the sol-formulation in an amount between about 0.1 wt. % and about 50 wt. % of the total weight of the sol-formulation, more preferably from about 1-12 wt. % of the total weight of the first sol formulation. The total ash content of the sol-formulation may vary from 0.05% to 20% by mass of the first sol formulation.

In the first sol formulation, the silica based nanoparticles may be spherical or non-spherical (e.g., elongated, pearl-shaped, or disc-shaped), such as silica based nanoparticles with at least one dimension between 10 and 200 nm. The silica based nanoparticles may be selected from spherical particles having a particle size from about 40 to 50 nm, spherical particles having a particle size from about 70 to 100 nm, spherical particles having a particle size from about 10 to 15 nm, spherical particles having a particle size from about 17 to 23 nm, elongated particles having a diameter from 9 to 15 nm and length of 40 to 100 nm, and combinations thereof. The silica based nanoparticles may be colloidal silica mono-dispersed in an organic solvent. Exemplary organic solvents include N,N-Dimethyl acetamide, ethylene glycol, isopropanol (IPA), methanol, methyl ethyl ketone, methyl isobutyl ketone, and methanol. The amount of silica based nanoparticles present in the organic solvent may comprise between from about 15 wt. % and 45 wt. % of the total colloidal silica in organic solvent system. The colloidal silica in organic solvent system may comprise less than 3.0% water. The colloidal silica in organic solvent may have a viscosity less than 100 mPa·s, and/or a pH from about 2 to 6.

Exemplary silica based nanoparticles are available from Nissan Chemical America Corporation under the tradename ORGANOSILICASOL™. Suitable commercially available products of that type include ORGANOSILICASOL™ IPA-ST silica particles (particle size of 10-15 nm, 30-31 wt. % of $SiO_2$), ORGANOSILICASOL™ IPA-ST-L silica particles (particle size of 40-50 nm, 30-31 wt. % of $SiO_2$), ORGANOSILICASOL™ IPA-ST-MS silica particles (particle size of 17-23 nm, 30-31 wt. % of $SiO_2$), ORGANOSILICASOL™ IPA-ST-UP silica particles (particles have a diameter of 9-15 nm with a length of 40-100 nm, 15-16 wt. % of $SiO_2$), and ORGANOSILICASOL™ IPA-ST-ZL silica particles (particle size of 70-100 nm, 30-31 wt. % of SiO2). Other exemplary silica based nanoparticles are available from Nissan Chemical America Corporation under the tradename SNOWTEX® colloidal silica. Suitable commercially available products of that type include SNOWTEX® ST-20L colloidal silica (particle size of 40-50 nm, 20-21 wt. % of $SiO_2$), SNOWTEX® ST-40 colloidal silica (particle size of 10-20 nm, 40-41 wt. % of $SiO_2$), SNOWTEX® ST-50 colloidal silica (particle size of 20-30 nm, 47-49 wt. % of $SiO_2$), SNOWTEX® ST-C colloidal silica (particle size of 10-20 nm, 20-21 wt. % of $SiO_2$), SNOWTEX® ST-N colloidal silica (particle size of 10-20 nm, 20-21 wt. % of $SiO_2$), SNOWTEX® ST-O colloidal silica (particle size of 10-20 nm, 20-21 wt. % of $SiO_2$), SNOWTEX® ST-OL colloidal silica (particle size of 40-50 nm, 20-21 wt. % of $SiO_2$), SNOWTEX® ST-ZL colloidal silica (particle size of 70-100 nm, 40-41 wt. % of $SiO_2$), SNOWTEX® ST-PS-M colloidal silica (particle size of 18-25 nm/80-150 nm, <0.2 wt. % of $SiO_2$), SNOWTEX® ST-PS-MO colloidal silica (particle size of 18-25 nm/80-150 nm, 18-19 wt. % of $SiO_2$), SNOWTEX® ST-PS-S colloidal silica (particle size of 10-15 nm/80-120 nm, 15-16 wt. % of $SiO_2$), SNOWTEX® ST-PS-0 colloidal silica (particle size of 10-15 nm/80-120 nm, 15-16 wt. % of $SiO_2$), SNOWTEX® ST-OUP colloidal silica (particle size of 9-15 nm/40-100, 15-16 wt. % of $SiO_2$), and SNOWTEX® ST-UP colloidal silica (particle size of 9-15 nm/40-100 nm, <0.2 wt. % of $SiO_2$). The amount of silica based nanoparticles in the first sol formulation may be at least 0.01 wt. %, 0.05 wt. %, 1 wt. %, 1.5 wt. %, 2 wt. %, 2.5 wt. %, 3 yd. %., 3.5 wt. %, 5 wt. %, 7 wt. %, 9 wt. %, 11 wt. %, or 13 wt. % of the total weight of the first sol formulation. The amount of silica based nanoparticles in the first sol formulation may comprise up to 0.05 wt. %, 1 wt. %, 1.5 wt. %, 2 wt. %, 2.5 wt. %, 3 wt. %., 3.5 wt. %, 5 wt. %, 7 wt. %, 9 wt. %, 11 wt. %, 13 wt. %, or 15 wt. % of the total weight of the first sol formulation. The amount of the silica based nanoparticles in the first sol formulation may be present in an amount between about 0.01 wt. % and about 15 wt. % of the total weight of the first sol formulation. A mass ratio of the alkyltrialkoxysilane-based binder to silica based nanoparticles may be between 60:40 and 90:10. Exemplary ratios of the alkyltrialkoxysilane-based binder to the silica based nanoparticles include 60:40, 70:30, 80:20, 85:15, and 90:10. It is noted that the first sol formulation may further include rare-earth-based oxide nanoparticles.

As mentioned above, the first sol formulation may include an acid or base catalyst for controlling the rates of hydrolysis and condensation. The acid or base catalyst may be an inorganic or organic acid or base catalyst. Exemplary acid catalysts may be selected from the group consisting of hydrochloric acid (HCl), nitric acid ($HNO_3$), sulfuric acid ($H_2SO_4$), acetic acid (e.g., $CH_3COOH$), phosphoric acid ($H_3PO_4$), citric acid, and combinations thereof. Exemplary base catalysts include tetramethylammonium hydroxide (TMAH), sodium hydroxide (NaOH), potassium hydroxide (KOH, and the like. The acid catalyst level may be 0.001 to 10 times in stoichiometric amount compared with the alkyltrialkoxysilane-based binder. The acid and/or base catalyst level may be from 0.001 wt. % to 1 wt. % of the total weight of the first sol formulation.

The first sol formulation may further include a solvent system. The solvent system may include a non-polar solvent, a polar aprotic solvent, a polar protic solvent, and/or combinations thereof. Selection of the solvent system and the porosity forming agent may be used to influence the formation and size of pores. Exemplary solvents include alcohols, for example, n-butanol, isopropanol, n-propanol, ethanol, methanol, and other well known alcohols. The amount of solvent in the first sol formulation may comprise at least 50 wt. %, 55 wt. %, 60 wt. %, 65 wt. %, 70 wt. %, 75 wt. %., 80 wt. %, 85 wt. %, or 90 wt. % of the total weight of the first sol formulation. The amount of solvent in the first sol formulation may comprise up to 55 wt. %, 60 wt. %, 65 wt. %, 70 wt. %, 75 wt. %., 80 wt. %, 85 wt. %, 90 wt. %, or 95 wt. % of the total weight of the first sol formulation. The amount of solvent may be from 50 wt. % to 95 wt. % of the total weight of the first sol formulation. The solvent system may further include water (e.g., from about 0.5 to 7% wt. %, more preferably from about 1-3 wt. % of the first sol formulation) and/or a surfactant for stabilizing the sol-gel composition.

A first example first sol formulation can be prepared using cyclohexyltrimethoxysilane as the alkyltrialkoxysilane-based binder, n-propanol as a solvent, acetic acid as a catalyst, ORGANOSILICASOL™ IPA-ST-UP elongated silica particles, and water. The total ash content of the solution was 4% (based on equivalent weight of $SiO_2$ produced). The ratio of alkyltrialkoxysilane-based binder to silica particles (cyclohexyltrimethoxysilane:IPA-ST-UP particles) was 25:75 ash content contribution. Cyclohexyltrimethoxysilane and silica particles were mixed with water (2 times the molar cyclohexyltrimethoxysilane amount), acetic acid (0.05 times the molar cyclohexyltrimethoxysilane amount) and n-propanol.

A second example first sol formulation can be prepared using n-hexyltriethxoysilane as the alkyltrialkoxysilane-based binder, n-propanol as the solvent, acetic acid as the catalyst, ORGANOSILICASOL™ IPA-ST-UP elongated silica particles, and water. The total ash content of the solution is 4% (based on equivalent weight of $SiO_2$ produced). The ratio of alkyltrialkoxysilane-based binder to silica particles (n-hexyltriethxoysilane:IPA-ST-UP particles) is 25:75 ash content contribution. N-hexyltriethxoysilane and silica particles are mixed with water (2 times the molar n-hexyltriethxoysilane amount), acetic acid (0.05 times the molar n-hexyltriethxoysilane amount) and n-propanol. The solution is stirred at room temperature and stirred for 24 hours at 60 degrees Celsius.

A third example first sol formulation can be prepared using cyclohexyltrimethoxysilane as the alkyltrialkoxysilane-based, n-propanol as the solvent, acetic acid as the catalyst, ORGANOSILICASOL™ IPA-ST-UP elongated silica particles, and water. The total ash content of the solution is 4% (based on equivalent weight of $SiO_2$ produced). The ratio of alkyltrialkoxysilane-based binder to silica particles (cyclohexyltrimethoxysilane:IPA-ST-UP particles) is 35:65 ash content contribution. Cyclohexyltrimethoxysilane and silica particles are mixed with water (2 times the molar cyclohexyltrimethoxysilane amount), acetic acid (0.5 times the molar cyclohexyltrimethoxysilane amount) and n-propanol. The solution is stirred for 24 hours at room temperature.

Second Sol Formulation

Example tetra-alkoxysilane based binders for the second sol formulation may be selected from the group consisting of: tetraethyl orthosilicate (TEOS), tetramethoxysilane, tetraethoxysilane, tetra-n-propoxysilane, tetra-i-propoxysilane, tetra-n-butoxysilane, tetra-t-butoxysilane, and combinations thereof.

The second sol formulation includes silica based nanoparticles of the same type(s), shape(s), size(s), and amount(s) as described above in connection with the first sol formulation. In the second sol formulation, the silica based nanoparticles may be colloidal silica mono-dispersed in an organic solvent. Exemplary organic solvents include N,N-Dimethyl acetamide, ethylene glycol, isopropanol (IPA), methanol, methyl ethyl ketone, methyl isobutyl ketone, and methanol. The colloidal silica in organic solvent system may comprise less than 3.0% water. Exemplary silica based nanoparticles for the second sol formulation are the same as those identified above for the first sol formulation. The first and second sol formulations may contain at least about 7% (more preferably at least about 9%) by weight silicon oxide nanoparticles, and the second sol formulation may contain a greater percentage (e.g., at least 4% more) of nanoparticles than the first sol formulation in certain example embodiments. Water-based silica nanoparticles can also be used, with the size of silica nanoparticles ranging from about 10-100 nm at a weight percentage of from about 18-40%. The weight percentage of spherical silica nanoparticles in solution may range from about 18-40%, which corresponds to about 60-80% of solvent in the silica solution. The amount of solid $SiO_2$ may be from about 2-6 wt % in the sol formulation. However, the solid percentage can be from 0.6-10 wt. %, with the amount of solvent comprising from about 60-97 wt. %.

A typical solvent used in the silica solution includes alcohol, such as isopropanol, methanol and ethanol. However, other useful solvents include N,N-dimethyl acetamide, ethylene glycol, ethylene glycol mono-n-propyl ether, methyl ethyl ketone and methyl isobutyl ketone. Isopropanol is the recommended solvent for silica nanoparticles ranging in size from 10 to 100 nm.

The second sol formulation may include from about 0.1 wt. % to about 50 wt. % of tetra-alkoxysilane based binder(s); from about 0.1 wt. % to about 15 wt. % of silica-based nanoparticles; from about 50 wt. % to about 95 wt. % of an alcohol containing solvent; and from about 0.001 wt. % to about 0.1 wt. % of an acid or base containing catalyst. In the second sol formulation, for example, the tetra-alkoxysilane based binder(s) may be any of those identified above, and the alcohol containing solvent may be of or include n-propyl alcohol, and the acid or base containing catalyst may be of or include citric acid, acetic acid, HCl, and/or nitric acid. In certain example embodiments, the amount of tetra-alkoxysilane based binder(s) binder can range from 0.3 to 20 mol. %; the amount of acid (which serves as a catalyst) can range from about 0.01-7 mol. %; and the molar ratio of water to silica can range from about 1.1 to 50.

The amount of tetra-alkoxysilane based binder(s) in the second sol formulation may comprise at least 0.1 wt. %, 1 wt. %, 5 wt. %, 7 wt. %, 9 wt. %, 10 wt. %, 12 wt. %, 15 wt. %, 20 wt. %, 25 wt. %, 30 wt. %, 35 wt. %, 40 wt. %, or 45 wt. % of the total weight of the second sol formulation. The amount of tetra-alkoxysilane based binder(s) in the second sol-formulation may comprise up to 1 wt. %, 5 wt. %, 7 wt. %, 9 wt. %, 10 wt. %, 12 wt. %, 15 wt. %, 20 wt. %, 25 wt. %, 30 wt. %, 35 wt. %, 40 wt. %, or 45 wt. % or 50 wt. % of the total weight of the second sol formulation. The amount of the tetra-alkoxysilane based binder(s) in the second sol formulation may be present in the sol-formulation in an amount between about 0.1 wt. % and about 50 wt. % of the total weight of the sol-formulation, more preferably from about 1-12 wt. % of the total weight of the second sol formulation. The total ash content of the sol-formulation may vary from 0.05% to 20% by mass of the second sol formulation.

The second sol formulation may include an acid or base catalyst for controlling the rates of hydrolysis and condensation. The acid or base catalyst may be an inorganic or organic acid or base catalyst. Exemplary acid catalysts may be selected from the group consisting of hydrochloric acid (HCl), nitric acid ($HNO_3$), sulfuric acid ($H_2SO_4$), acetic acid (e.g., $CH_3COOH$), phosphoric acid ($H_3PO_4$), citric acid, and combinations thereof. Exemplary base catalysts include tetramethylammonium hydroxide (TMAH), sodium hydroxide (NaOH), potassium hydroxide (KOH, and the like. The acid catalyst level may be 0.001 to 10 times in stoichiometric amount compared with the binder. The acid and/or base catalyst level may be from 0.001 wt. % to 1 wt. % of the total weight of the second sol formulation. The second sol formulation may further include a solvent system. The solvent system may include a non-polar solvent, a polar aprotic solvent, a polar protic solvent, and/or combinations thereof. Selection of the solvent system and the porosity forming agent may be used to influence the formation and size of pores. Exemplary solvents include alcohols, for example, n-butanol, isopropanol, n-propanol, ethanol, methanol, and other well known alcohols. The amount of solvent in the second sol formulation may comprise at least 50 wt. %, 55 wt. %, 60 wt. %, 65 wt. %, 70 wt. %, 75 wt. %., 80 wt. %, 85 wt. %, or 90 wt. % of the total weight of the second sol formulation. The amount of solvent in the second sol formulation may comprise up to 55 wt. %, 60 wt. %, 65 wt. %, 70 wt. %, 75 wt. %., 80 wt. %, 85 wt. %, 90 wt. %, or 95 wt. % of the total weight of the second sol formulation. The amount of solvent may be from 50 wt. % to 95 wt. % of the total weight of the second sol formulation. The solvent system may further include water (e.g., from about 0.5 to 7% wt. %, more preferably from about 1-3 wt. % of the first sol formulation) and/or a surfactant for stabilizing the sol-gel composition.

An example second sol formulation can be prepared using TEOS as the tetra-alkoxysilane based binder, n-propanol as a solvent, acetic acid as a catalyst, ORGANOSILICASOL™ IPA-ST-UP elongated silica particles, and water, in any of the amounts discussed herein. For example, the solvent can be present as approximately 65-75 wt. % of the second sol solution, the water from about 1-3 wt. %, the acetic acid from about 3-8 wt. %, and the TEOS from about 2-10 wt. % of the second sol solution. The solution can be stirred at room temperature and stirred for 24 hours at 60 degrees Celsius.

The blending of the first and second sol formulations, after aging of each, may comprise providing more of the second sol formulation than the first sol formulation in the blended coating sol formulation. The coating sol formulation which results from the blending may comprise by weight from about 60-80% (more preferably from about 65-75%) of the second sol formulation and from about 20-40% (more preferably from about 25-35%) of the first sol formulation. The method may include aging (e.g., for at least about 5 days, more preferably from about 5-30 or 5-25 days) the coating sol formulation prior to coating the glass substrate with the coating sol formulation (e.g., via dip coating or spin coating).

Visible transmittance and can be increased by at least about 2.8% as a result of said coating being applied on (directly or indirectly) the glass substrate, more preferably by at least about 3%. As a general proposition, the transmission of light through a material causes the wavelength of the light to change as the frequency remains unchanged, thus slightly altering the speed of light through the material. The refractive index of a material is defined as a measure of the speed of light through a substance and generally is expressed as the ratio of the speed of light in vacuum relative to the speed of light in the material. Low reflectivity coatings typically have an optimized refractive index (n) that falls between air (where n=1) and glass (n~1.5). An anti-reflective coating is a type of low reflectivity coating applied to the surface of a transparent article (e.g., glass) in order to reduce the reflectance of visible light from the article and enhance the transmission of light into and through the article with a resulting decrease in the refractive index.

Certain embodiments of this invention relate to sol-gel processes and sol formulations used to produce low refractive index coatings on glass substrates. The term sol-gel process is a process where a wet formulation (blended coating including the blending of the first and second sol formulations) forms a gel coating having both liquid and solid characteristics that is applied to a glass substrate and then heat treated to form a final solid coating. Sol gel processes have proven to be valuable for developing new anti-reflective glass coatings because of their ability to produce very thin films having uniform compositions and precise thicknesses. Tests performed on anti-reflection glasses indicate that the overall mechanical strength of the anti-reflection (AR) thin film and the level of adhesion of the thin film to the glass substrate can be improved by the blending process described herein which is performed prior to coating onto the substrate. Thus, it is desirable to improve the mechanical strength and adhesive qualities of anti-reflection films made by a sol gel process while at the same time improving the light transmittance of the final product.

For purposes of comparison, a second sol formulation described above including TEOS as a binder was prepared alone and coated onto a glass substrate without being blended with any other sol formulation. Likewise, a first sol formulation described above was prepared alone and coated onto a glass substrate without being blended with any other sol formulation.

A method for improving the mechanical strength of AR thin film of anti-reflection glass has been found by blending the first and second sols prior to coating the resulting bended sol onto a glass substrate. AR glass made by the second sol alone has demonstrated good mechanical strength and good optical performance as shown by good levels of transmittance (Tqe % gain) and refractive index using tetraethyl orthosilicate ("TEOS" having the structure of tetra-alkoxysilane) as a binder. And the first sol has shown good optical performance using a lower level acid and cyclohexyltrimethoxylsilane ("CTMS" having the structure of tri-alkoxysilane) as a binder. However, the first and second sol formulations differ in physical and chemical properties, particularly their hydrolysis and condensation rates. For example, although the hydrolysis rate of CTMS (having the structure of tri-alkoxysilane) used as a binder is higher than that of TEOS (having the structure of tetra-alkoxysilane), the condensation rate of CTMS is lower than that of TEOS. Thus, when used as a sol component, it has been found that the lower condensation rate of CTMS can result in incomplete reaction of the binder with the glass surface and hence a lower crosslinking density, at times resulting in thin films with weaker mechanical strength and poor adhesion with the glass surface. It has been found that the durability of matte-matte and solar float anti-reflection glass can be significantly improved through the use of sol coatings made by blending a first sol formulation including a tri-alkoxysilane based binder with a second sol formulation including a tetra-alkoxysilane based binder, and aging the respective sols before blending to form a coating sol formulation. AR glass products can then be prepared by spin coating or dip coating the blended coating sol formulation onto the surface of the glass substrate and curing the coated glass in an oven (e.g., from about 580-800 degrees C., e.g., about 650° C., for about from 10-12 minutes, e.g., about 3.5 minutes). The improved mechanical strength of the anti-reflection thin films using the new blending process is attributed to the formation of a network having a higher crosslinked density generated by the binder in the second sol (e.g., tetraethyl orthosilicate), which has a faster condensation rate than the binder in the first sol (e.g., cyclohexyltrimethoxysilane). A higher transmittance of broadband (Tqe % gain) can also be achieved using anti-reflection glass made from the blended tri-alkoxysilane and tetra-alkoxysilane inclusive sols. For example, Tqe % gain is from about 2.8 to 3.2%, e.g., about 2.87% and 3.1% respectively for matte-matte and solar float anti-reflection glasses.

It has also been found that an increased in the amount of the tetra-alkoxysilane (e.g., TEOS) in blends of tri-alkoxysilane and tetra-alkoxysilane can enhance the crosslink density of the thin film and result in a thin film having a structure with smaller pores and hence lower porosity. Consequently, a higher refractive index has been observed in such products. The resulting anti-reflection glass also demonstrates excellent performance durability and passes water boil tests, as well as standard NaOH (0.1 N), tape pull and Taber tests. Thus, in the blend, it may be desirable to use more of the second sol than the first sol as discussed herein. For example, the coating sol formulation which results from the blending may comprise by weight from about 60-80% (more preferably from about 65-75%) of the second sol formulation and from about 20-40% (more preferably from about 25-35%) of the first sol formulation.

The first and second sols were blended in different amounts as indicated in Table 1 below. This series of sols with different tetralkoxysilane amounts in the blended sols were prepared for the purpose of investigating the effect of the mixed silanes on the optical performance and durability of the AR glass, in particular for purposes of testing the glass for higher transmittance in broadband and improved mechanical strength.

TABLE 1

Formulations of sol with two silanes by blending first and second sol formulations.

| Vol. ml | | | Solid wt., g | | Total solid wt, g | Wt % tetraalkoxysilane in the binder |
|---|---|---|---|---|---|---|
| $2^{nd}$ Sol | $1^{st}$ Sol | NPA*, ml | $2^{nd}$ Sol | $1^{st}$ Sol | | |
| 20 | 0 | 9.121 | 0.719 | 0.000 | 0.719 | 100 |
| 4 | 16 | 8.593 | 0.144 | 0.561 | 0.705 | 20 |
| 10 | 10 | 8.791 | 0.360 | 0.350 | 0.710 | 50 |
| 16 | 4 | 8.989 | 0.575 | 0.140 | 0.715 | 80 |
| 0 | 20 | 8.460 | 0.000 | 0.701 | 0.701 | 0 |

*Sol diluted to 3 wt. % by n-propyl alcohol.

Matte-matte glass and solar float glass having a size of 3"×3" and thickness of 3.2 mm were carefully washed by non-ionic detergent, rinsed with de-ionized water and dried by N2 gas. Each glass sample was then mounted on the sample stage of a spin coater equipped with a vacuum line. The spin speed was adjusted according to the type of glass and sols being used and the spin speed was set at 25.5 rps. Two milliliters (ml) of the blended coating sol were transferred onto the glass surface by pipette with a spin time of 30 sec. The coated glass was then heated in the box furnace at 650° C. for 3.5 min. The glass was removed from the furnace and cooled down to room temperature. No deformation of the glass could be seen following curing and the glass surface was very smooth.

The transmittance of raw and anti-reflection glass in broadband (400-1200 nm) was determined using a UV-Vis spectroscopy meter. The average Tqe % was calculated according to Equation (1) below:

$$Tqe\ \% = \frac{\sum_{i=400}^{1200} (Tqe\ \%)_i}{\sum_{i=400}^{1200} N_i} \quad (1)$$

The transmission gain, ΔTqe %, was calculated by subtracting the Tqe % of the raw glass from the Tqe % of the anti-reflection glass as shown in Equation (2). The durability was also determined by subtracting the pre Tqe % from the post Tqe % of the anti-reflection glass according to Equation (3) as shown:

$$\Delta Tqe\%_{|Optical} = (Tqe\%)_{AR} - (Tqe\%)_{raw} \quad (2)$$

$$\Delta Tqe\%_{|Durability} = (Tqe\%)_{psotAR} - (Tqe\%)_{preAR} \quad (3)$$

The optical thickness and refractive index of various anti-reflection glass samples were evaluated using an ellipsometer. Each sample was scanned at multiple angles in order to measure the complex reflectance ratio, ρ, which is parameterized by Ψ and Δ. The refractive index of the anti-reflection glass was then determined and reported at a wavelength of 550 nm.

The water boil test follows the following procedure. The anti-reflection glass was immersed in a beaker filled with de-ionized water at 100° C. After 10 min, the glass was removed from the boiling water and dried by $N_2$ gas before taking a UV-vis measurement. The change of Tqe % was calculated as the difference of Tqe % before and after the water boil test. The error specification for the water boil test is ΔTqe %<±0.5%.

The NaOH test used the following procedure. The anti-reflection glass sample was immersed in an NaOH solution (0.1 N) in a beaker at room temperature. After 1 hour, the glass was taken from solution, washed with de-ionized water and dried by $N_2$ gas. The change of Tqe % was then calculated by determining the difference of Tqe % before and after the NaOH test. The error specification of the water boil test was ΔTqe %<±0.5%.

The tape pull test used the following procedure. The tape (type 31790, manufactured by 3M) was adhesively applied on the surface of the anti-reflection glass by pressuring the tape with a finger. After 1.5 minutes, the tape was pulled off quickly by hand and the residual adhesive on the tape removed with tissue paper (AccuWipe soaked with n-propyl alcohol). The change of Tqe % was then calculated as the difference of Tqe % before and after the tape pull test, with the error specification of the test being ΔTqe<1.5%.

The resistance of an exemplary anti-reflection thin film was evaluated as a measure of the surface abrasion using a standard Taber test. The transmittance of the anti-reflection glass was then measured before and after a surface abrasion test. The Taber model used for the test was an Abraser Model 5130. The error specification of the test is ΔTqe<=2.0%.

The Crockmeter test uses a glass size of 3"×3" and with a total test cycle of 500. The error specification of the Crockmeter test is ΔTqe %<1.5%.

The salt fog test uses a solution with 5% NaCl with a pH is in the range of 6.5-7.2 adjusted by a NaOH solution. The anti-reflection glass sample was washed with Windex before the test. The chamber temperature was set to 35° C. and the test time was 4 days. The error specification of the salt fog test is ΔTqe %<2%.

Figure 2:
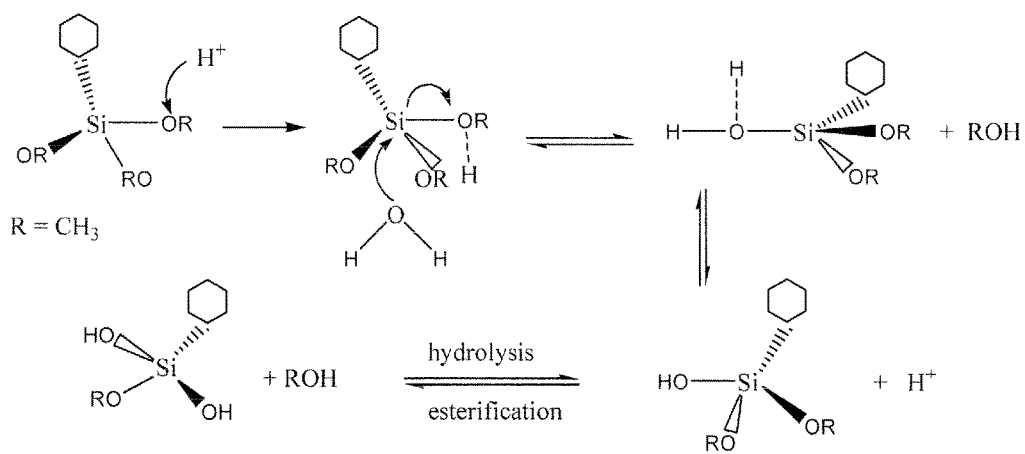
FIG. 2 is a graphic depiction of the chemical reaction showing the hydrolysis of cyclohexyltrimethoxysilane (CTMS) with acid as a catalyst.

FIGS. 1 and 2 below show the hydrolysis of tetraethyl orthosilicate and cyclohexyltrimethoxysilane, respectively, with acid as the catalyst. The following mechanisms generally describe the hydrolysis of tetraethyl orthosilicate and cyclohexyltrimethoxysilane. First, the electrophilicity of the Si atom is enhanced by the attack of a proton on the OR group in the tetraethyl orthosilicate or cyclohexyltrimethoxysilane. The proton is released from the acetic acid. The Si atom (which has greater electrophilicity) is easily attacked by a water molecule and an intermediate is therefore generated as shown in FIGS. 1 and 2. The further reaction of the intermediate produces the hydrolyzed tetraethyl orthosilicate or cyclohexyltrimethoxysilane and releases a proton, $H^+$, which is again used as the catalyst.

Figure 3:
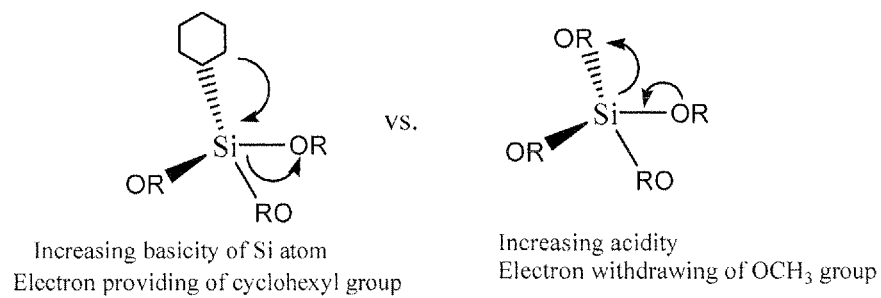
FIG. 3 is a graphic depiction of the electronic status of the silicone atoms in the cyclohexyltrimethoxysilane and tetraethyl orthosilicate.

The process is reversible and can be repeated to generate various forms of hydrolyzed tetraethyl orthosilicate, for example silicic acid $Si(OH)_4$ as fully hydrolyzed tetraethyl orthosilicate. An esterification may also take place during the process. It has been found that the hydrolysis rate of cyclohexyltrimethoxysilane is faster than that of tetraethyl orthosilicate because of the cyclohexyl group having the characteristics of an electron donor (see FIG. 3) that increases the electrophilicity of the OR group and render it vulnerable to attack by a proton.

Figure 4:
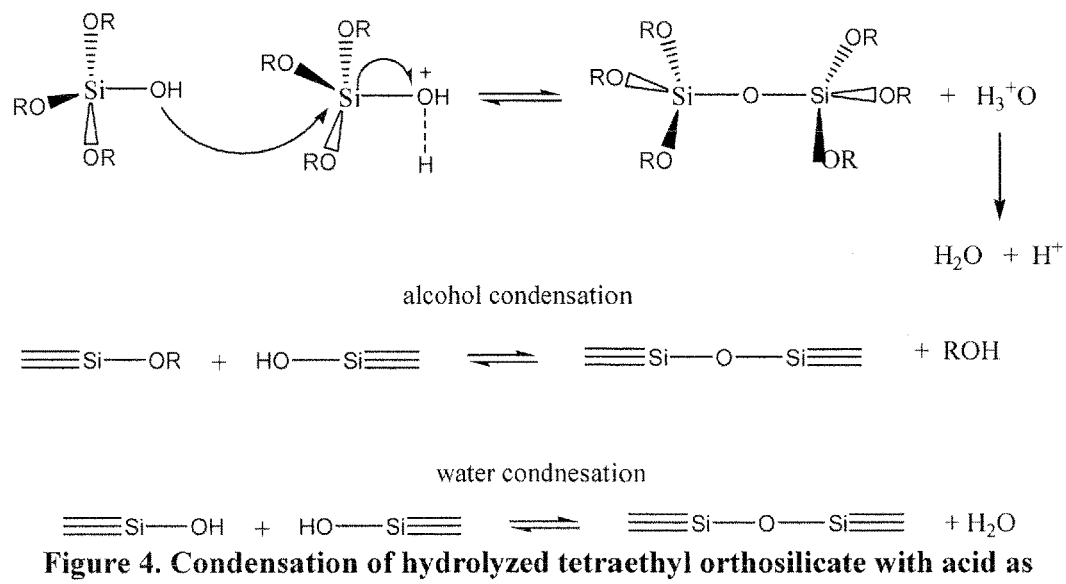
FIG. 4 is a graphic depiction of the chemical reaction of the condensation of hydrolyzed tetraethyl orthosilicate with acid as a catalyst.
Figure 5:
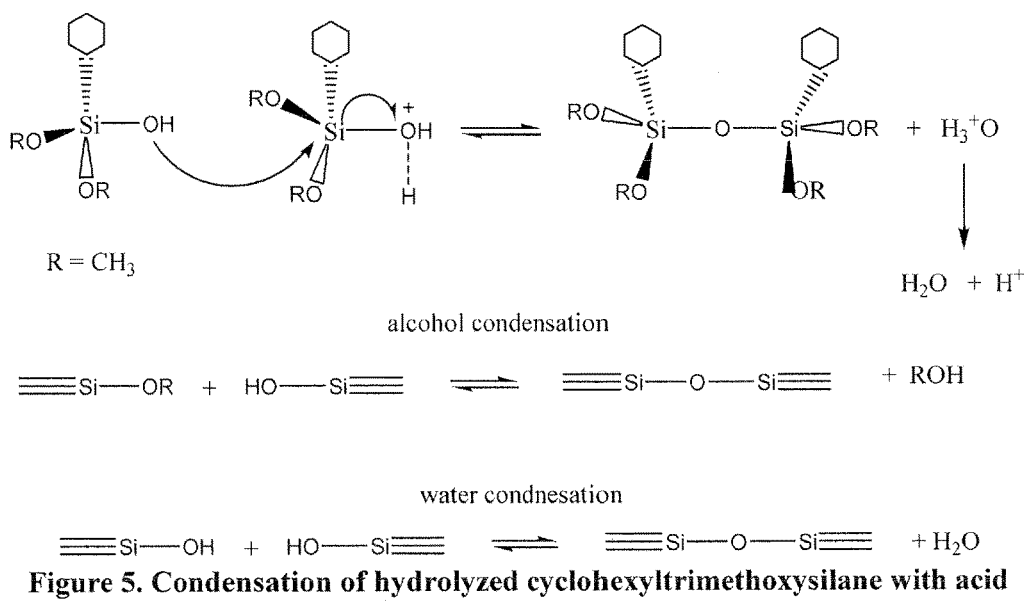
FIG. 5 is a graphic depiction of the chemical reaction of the condensation of hydrolyzed cyclohexyltrimethoxysilane with acid as a catalyst.

The hydrolyzed tetraethyl orthosilicate and cyclohexyltrimethoxysilane can be further condensed by a water and alcohol condensation as shown in FIGS. 4 and 5, which depict the reversible reactions of hydrolysis and alcoholysis, respectively. The proton attacks an oxygen atom in the hydroxyl group of the hydrolyzed alkoxysilane, which in turn increases the electrophilicity of an Si atom that can be attacked by a hydroxyl group from a hydrolyzed alkoxysilane molecule. A water molecule is released from the intermediate and $H_3^+O$ is generated by the water and proton. The cyclohexyl group in cyclohexyltrimethoxysilane works as an electron donor increasing the basicity of the Si atom which decreases the overall condensation rate. Conversely, the $CH_3CH_2$ group in tetraethyl orthosilicate increases the acidity of Si atom, which in turn increases the condensation rate. The steric effect of the cyclohexyl group reduces the condensation rate of the cyclohexyltrimethoxysilane.

Figure 6:
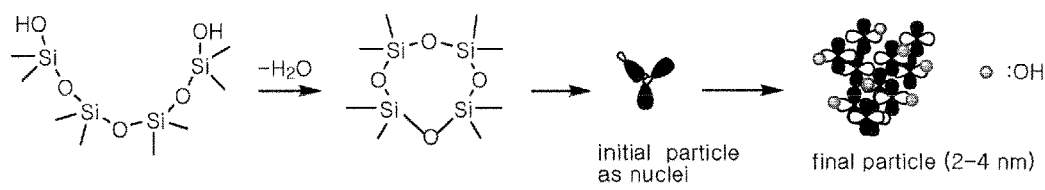
FIG. 6 is a graphic depiction of the formation of nanoparticles from cyclic siloxane by condensation.

Various hydrolyzed tetraethyl orthosilicate and cyclohexyltrimethoxysilane groups can be condensed to develop cyclic siloxane with different cyclic numbers, such as tetra-cyclic siloxane, as illustrated in FIG. 6. Because of the reduced stability of tri-siloxane compounds, applicants believe that primary cyclic siloxane is generated from tetramer due to less strain on the cyclic compound. The cyclic siloxane reacts with other cyclic siloxane or hydrolyzed tetraethyl orthosilicate or cyclohexyltrimethoxysilane to produce amorphous $SiO_2$ particles having the structure of a continuous random network. The results from a Si-NMR analysis support a mechanism whereby the condensation takes places in a manner that maximizes the number of Si—O—Si bonds and minimizes the number of terminal hydroxyl groups due to internal condensation. The three-dimensional particles serve as nuclei, and thus further growth occurs by the Ostwald ripening mechanism. That is, the particles grow in size and decrease in number as highly soluble small particles dissolve and re-precipitate on larger and less soluble nuclei. The growth stops when the difference in solubility between the smallest and largest particles become only a few ppm. Normally, the particles stop growing when they reach the size as 2-4 nm in a precursor solution having a pH of between 2-7.

Figure 7:
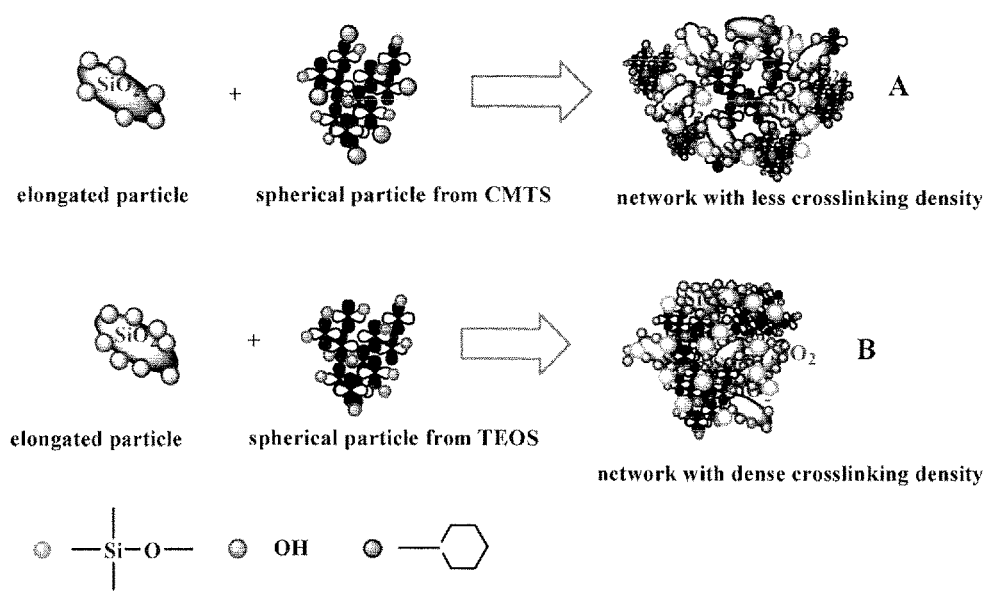
FIG. 7 is an illustration of an imaginary network made from sol with cyclohexyltrimethoxysilane (A) and tetraethyl orthosilicate (B)

The faster condensation in sols with tetraethyl orthosilicate has been found to result in a three dimensional network having a higher crosslinked density. FIG. 7 illustrates the various networks that applicants believe result from sols containing cyclohexyltrimethoxysilane (A) and tetraethyl orthosilicate (B). The network with higher crosslinking density will have a higher mechanical strength. The probability of chemical covalent bonding between the glass surface and the thin film also increases when tetraethyl orthosilicate is used as the binder due to a somewhat faster condensation rate and less steric hindrance.

Figure 8:
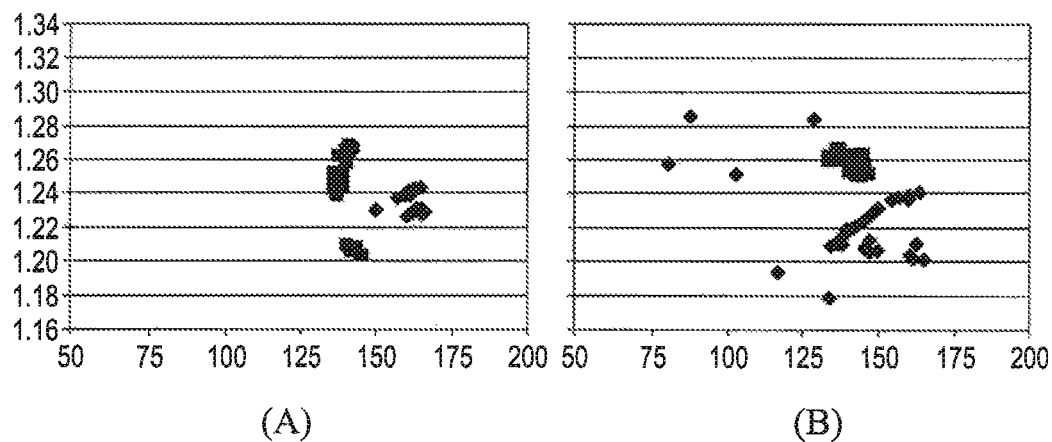
FIG. 8 is a series of plots showing the relationship between the refractive index and thickness of exemplary anti-reflection thin films according to the invention.

The refractive index of anti-reflection solar float and matte-matte glass made using only the first sol (squares in FIG. 8) and only the second sol (diamonds in FIG. 8) with the resulting test data shown in FIG. 8. A significant difference has been found to exist in the refractive index for AR matte matte glass made using these different sols alone. As FIG. 8 indicates, a relatively large variation in refractive index was observed for anti-reflection matte-matte glass made by second sol, compared with refractive index of anti-reflection matte-matte glass made by the first sol. A more conformal coating layer exerts in anti-reflection thin film using only the first sol. The conformal coating layer could be the result of a slower condensation rate of hydrolyzed cyclohexyltrimethoxysilane, which allows the gel to have enough time to generate a uniform thin film with the same pattern as matte-matte glass. However, the faster condensation rate of hydrolyzed tetraethyl orthosilicate allows the gel to be completed more quickly. As a result, an unconformable thin film may be formed using the second sol alone for the coating sol.

Figure 9:
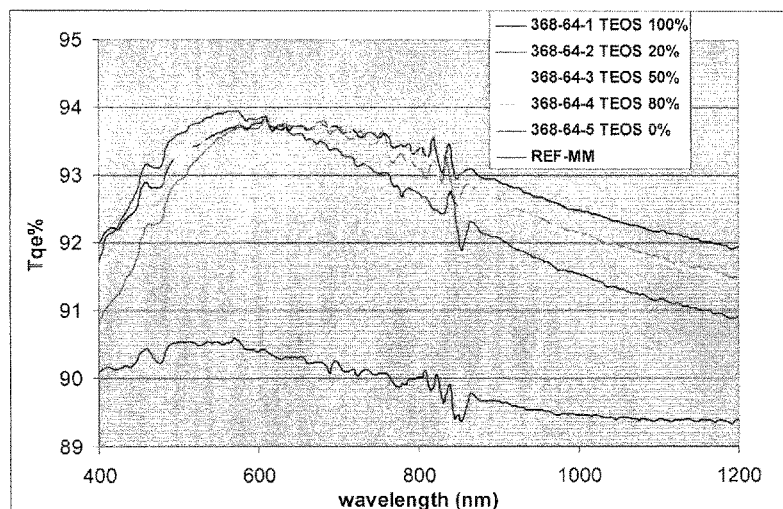
FIG. 9 is a plot of the transmittance spectra of anti-reflection matte-matte glass from blended first and second sols.
Figure 10:
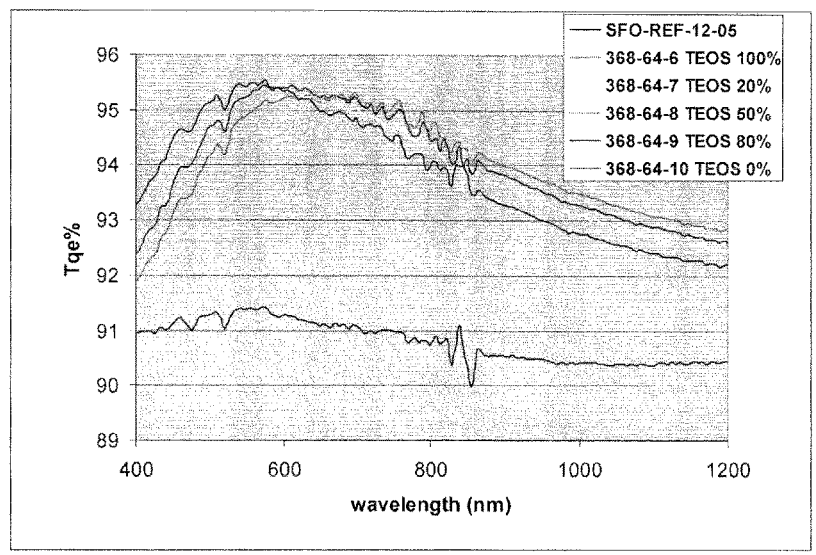
FIG. 10 is a plot of the transmittance of anti-reflection solar float glass from blended first and second sols.

The transmittance of anti-reflection matte-matte and solar float glass made by blending the first and second sols, after aging and prior to coating onto the glass, is summarized in Table 2 below. FIGS. 9 and 10 also illustrate the transmittance spectra of the anti-reflection matte-matte and solar float glass, respectively. In FIGS. 9-10, it is noted that Tqe % of raw glass is included as the bottom plot for reference, and of the remaining five plots on the right half of each of FIGS. 9-10 the 100% tetralkoxysilane plot has the highest Tqe % and the 0% tetralkoxysilane plot has the lowest Tqu %.

TABLE 2

Transmittance of anti-reflection matte-matte and solar float glass from blended sols.

| ID | Glass | tetralkoxysilane in binder wt. % | Peak (nm) | Tqe % raw glass | Tqe % AR | Tqe % gain |
|---|---|---|---|---|---|---|
| Matte-matte anti-reflection glass (3.2 mm) | | | | | | |
| 368-64-5 | MM/3.2 mm/smooth | 0 | 575 | 89.898 | 92.457 | 2.560 |
| 368-64-2 | MM/3.2 mm/smooth | 20 | 610 | 89.898 | 92.656 | 2.758 |
| 368-64-3 | MM/3.2 mm/smooth | 50 | 605 | 89.898 | 92.721 | 2.824 |
| 368-64-4 | MM/3.2 mm/smooth | 80 | 610 | 89.898 | 92.695 | 2.798 |
| 368-64-1 | MM/3.2 mm/smooth | 100 | 610 | 89.898 | 92.950 | 3.053 |
| SFO anti-reflection glass (3.2 mm) | | | | | | |
| 368-64-10 | SFO/3.2 mm/Sn | 0 | 575 | 90.796 | 93.834 | 3.038 |
| 368-64-7 | SFO/3.2 mm/Sn | 20 | 575 | 90.796 | 93.899 | 3.103 |
| 368-64-8 | SFO/3.2 mm/Sn | 50 | 610 | 90.796 | 94.008 | 3.211 |
| 368-64-9 | SFO/3.2 mm/Sn | 80 | 610 | 90.796 | 94.030 | 3.234 |
| 368-64-6 | SFO/3.2 mm/Sn | 100 | 680 | 90.796 | 94.023 | 3.227 |

*Coated side of anti-reflection glass: solar float = Sn side; matte-matte = smooth side
**Spin coating: 1400 rpm/255 rps/30 sec/2 ml of sol
***Cure: 650° C./3.5 min Table 2 shows the Tqe % gain as related to an increasing amount of tetralkoxysilane in blended sols/binders for both anti-reflection matte-matte and solar float glass. Meanwhile, the maximum peak transmittance curve shifts at a lower wavelength to a higher wavelength with increasing tetralkoxysilane amounts in the blended sols/binders. It can be seen from Table 2 that the blended sol formulation results in significantly higher Tqe % gain, and thus better AR characteristics, than does use of only the first sol (the two 0% tetralkoxysilane samples represent the first sol used alone without blending before coating onto the glass, and these samples have the lowest Tqe % for both types of glass).

Figure 11:
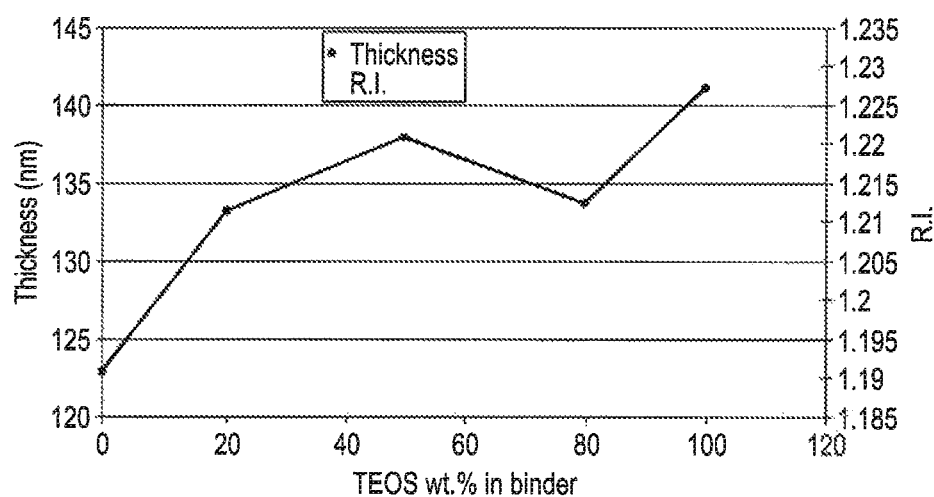
FIG. 11 is a plot showing the effect of tetraethyl orthosilicate (in wt. %) in mixed binders on the thickness and refractive index of exemplary anti-reflection thin films.

Table 3 lists the thickness and refractive index of thin films of anti-reflection solar float glass made from blended sols. FIG. 11 shows the relationship between tetralkoxysilane amount in blended binders and the optical performance of the anti-reflection glass.

TABLE 3

Thickness and refractive index of anti-reflection thin film

| ID | Glass/coating side | tetralkoxysilane wt. % in binder | Thickness (nm) | Refractive index (550 nm) |
|---|---|---|---|---|
| 368-64-5 | SFO/3.2 mm/Sn | 0 | 122.83 | 1.1962 |
| 368-64-2 | SFO/3.2 mm/Sn | 20 | 133.16 | 1.1895 |
| 368-64-3 | SFO/3.2 mm/Sn | 50 | 137.975 | 1.2115 |
| 368-64-4 | SFO/3.2 mm/Sn | 80 | 133.708 | 1.2227 |
| 368-64-1 | SFO/3.2 mm/Sn | 100 | 141.106 | 1.2284 |

*The labels are same as those in Table 5.

Generally, the thickness and refractive index of the anti-reflection film increases with additional tetralkoxysilane in the blended binder resulting from the blending of the first and second sols. For example, the thickness and refractive index of the film are 122.83 nm and 1.196 when only the first sol is used to coat the glass, i.e., a binder of 100% cyclohexyltrimethoxysilane. The thickness and refractive index increase to 141.11 nm and 1.228, respectively, for the anti-reflection glass made by pure tetralkoxysilane. The increase of refractive index may be attributed to the decrease of pore size and porosity of anti-reflection thin film made by sol with more tetralkoxysilane (or less cyclohexyltrimethoxysilane) in a blended binder. Thus, if a refractive index of from 1.2 to 1.3, or from about 1.21 to 1.27, is desired, then the blended sol approach performs much better than either the first sol or the second sol alone.

As FIG. 7 illustrates, the pore size and porosity of the thin film on anti-reflection glass made from sol with larger amounts of tetraethyl orthosilicate will be lower than those of anti-reflection glass from sol of pure cyclohexyltrimethoxysilane as the binder. That may explain why the refractive index of anti-reflection thin film from pure cyclohexyltrimethoxysilane is less than that of pure tetraethyl orthosilicate. Anti-reflection thin films with a large pore size and porosity may exhibit weaker mechanical strength, and the shrinkage of the thin films may be greater when the film is cooled down from a high temperature to room temperature. This may be why the AR coatings made by the first sol alone have poor mechanical strength.

Table 4 shows the change of Tqe % gain before and after a Crockmeter test for anti-reflection glass prepared by blending the first and second sols. All of the anti-reflection matte-matte glass samples passed the Crockmeter test (Tqe % changed less than 1.5 due to the test). However, only solar float anti-reflection glass made by sol with higher amounts of tetralkoxysilane in the binder (80%) passed the same test. The improved mechanical strength of the anti-reflection glass can be attributed to a greater amount of tetralkoxysilane in the mixed binder which enhances the crosslink density of the anti-reflection thin film and the adhesion of the anti-reflection thin film on the glass surface. Anti-reflection matte-matte glass having a rougher surface may also enhance the resistance of surface abrasion and may explain why all matte-matte anti-reflection glass passed the Crockmeter test and only a portion of the solar float anti-reflection glasses passed the same test.

TABLE 4

Crockmeter test of anti-reflection glass made by blended sols.

| ID | Glass | tetralkoxysilane wt. % | Peak (nm) | Tqe % pre | Tqe % post | Tqe % gain |
|---|---|---|---|---|---|---|
| 368-64-5 | MM/3.2 mm/smooth | 0 | 545 | 92.457 | 91.191 | −1.266 |
| 368-64-2 | MM/3.2 mm/smooth | 20 | 545 | 92.656 | 91.348 | −1.308 |
| 368-64-3 | MM/3.2 mm/smooth | 50 | 705 | 92.721 | 92.069 | −0.652 |
| 368-64-4 | MM/3.2 mm/smooth | 80 | 770 | 92.695 | 92.934 | 0.239 |
| 368-64-1 | MM/3.2 mm/smooth | 100 | 715 | 92.950 | 92.781 | −0.169 |
| 368-64-10 | SFO/3.2 mm/Sn | 0 | 545 | 93.834 | 91.336 | −2.498 |
| 368-64-7 | SFO/3.2 mm/Sn | 20 | 535 | 93.899 | 92.021 | −1.878 |
| 368-64-8 | SFO/3.2 mm/Sn | 50 | 550 | 94.008 | 92.257 | −1.751 |
| 368-64-9 | SFO/3.2 mm/Sn | 80 | 615 | 94.030 | 93.174 | −0.856 |
| 368-64-6 | 8FO/3.2 mm/Sn | 100 | 705 | 94.023 | 93.807 | −0.216 |

*Coated side of anti-reflection glass: solar float = Sn side; matte-matte = smooth side
**Spin coating: 1400 rpm/255 rps/30 sec/2 ml of sol
***Cure: 650° C./3.5 min Table 5 below summarizes the durability of anti-reflection matte-matte glass made by blended sols with 50 wt. % tetralkoxysilane in the blended binder after the blending of the first and second sols. As Table 5 shows, all of the anti-reflection glasses passed the water boil, NaOH, Tape pull, Taber and Crockmeter tests, thereby indicating significant improvement in durability over scenarios where the first sol is used alone to form the AR coating. This shows that the blending of the first and second sols unexpectedly and surprisingly significantly improves durability compared to using the first sol alone as the coating solution.

TABLE 5

Durability of matte-matte anti-reflection glass made by blended 1$^{st}$ & 2$^{nd}$ sols with 50 wt. % of tetralkoxysilane in blended binder.

| ID | Test item | Peak (nm) | Tqe % pre | Tqe % post | Tqe % Gain |
|---|---|---|---|---|---|
| 368-69-1 | Water boil | 750 | 93.247 | 93.205 | −0.042 |
| 368-69-2 | Water boil | 710 | 93.139 | 93.081 | −0.059 |
| 368-69-3 | Tape pull | 765 | 93.220 | 93.078 | −0.142 |
| 368-69-4 | Tape pull | 710 | 93.142 | 92.998 | −0.144 |
| 368-69-7 | NaOH | 600 | 93.248 | 92.962 | −0.286 |
| 368-69-8 | NaOH | 765 | 93.236 | 92.965 | −0.271 |
| 368-71-5 | Taber | 710 | 93.226 | 92.083 | −1.143 |
| 368-71-4 | Taber | 765 | 93.189 | 91.805 | −1.385 |

TABLE 5-continued

Durability of matte-matte anti-reflection glass made by blended 1st & 2nd sols with 50 wt. % of tetralkoxysilane in blended binder.

| ID | Test item | Peak (nm) | Tqe % pre | Tqe % post | Tqe % Gain |
|---|---|---|---|---|---|
| 368-71-1 | Crockmeter | 710 | 93.163 | 92.685 | −0.478 |
| 368-71-3 | Crockmeter | 765 | 93.317 | 92.501 | −0.816 |

Spin coating: 1200 rpm/255 rps/30 sec/2 ml
Cure: 650° C./3.5 min

The optical performances of AR glasses made by dip coating using only the second sol (top half of Table 6) compared to blending the first and second sols (bottom half of Table 6) are summarized below in Table 6. SFO (solar float glass), MM (matte-matte glass) and MP (matte prestimtic matte glass) glasses are used as substrates, and solid percentage of sol wa 1 wt. %. Four pieces of AR glass were prepared for each glass in order to estimate the average Tqe % gain and peak wavelength as well as error range. The highest Tqe % gain around 6.2% with peak wavelength around 720 nm is observed for SFO AR glass. It can be seen that overall the blending of the two sols (bottom half of Table 6) surprisingly resulted in improved gain compared to when only the second sol was used (top half of Table 6).

TABLE 6

Transmittance and peak wavelength of AR glasses made by dip coating

| ID | Glass | Peak (nm) | Tqe % raw | Tqe % AR | Tqe % gain | Tqe % gain Ave. | STD | Peak (nm) Ave. | STD |
|---|---|---|---|---|---|---|---|---|---|
| 2nd Sol Only Used to Coat Glass (1 wt. %) | | | | | | | | | |
| 169-1 | SFO | 710 | 90.823 | 97.055 | 6.232 | 6.155 | 0.083 | 734 | 24 |
| 169-2 | SFO | 768 | 90.823 | 96.875 | 6.052 | | | | |
| 169-3 | SFO | 727 | 90.823 | 97.034 | 6.211 | | | | |
| 169-4 | SFO | 730 | 90.823 | 96.947 | 6.124 | | | | |
| 169-5 | MM | 730 | 90.355 | 95.770 | 5.415 | 5.361 | 0.060 | 735 | 25 |
| 169-6 | MM | 710 | 90.355 | 95.650 | 5.295 | | | | |
| 169-7 | MM | 770 | 90.355 | 95.680 | 5.325 | | | | |
| 169-8 | MM | 730 | 90.355 | 95.764 | 5.409 | | | | |
| 169-9 | MP | 730 | 89.199 | 94.891 | 5.691 | 5.550 | 0.195 | 754 | 44 |
| 169-10 | MP | 820 | 89.199 | 94.944 | 5.745 | | | | |
| 169-11 | MP | 735 | 89.199 | 94.577 | 5.378 | | | | |
| 169-12 | MP | 730 | 89.199 | 94.586 | 5.387 | | | | |
| Blended 1st/2nd Sols Used to Coat Glass (30/70 wt. ratio; 1 wt. %) | | | | | | | | | |
| 170-1 | SFO | 730 | 90.823 | 97.051 | 6.228 | 6.178 | 0.039 | 716 | 9 |
| 170-2 | SFO | 710 | 90.823 | 96.958 | 6.134 | | | | |
| 170-3 | SFO | 710 | 90.823 | 97.005 | 6.181 | | | | |
| 170-4 | SFO | 715 | 90.823 | 96.990 | 6.167 | | | | |
| 170-5 | MM | 730 | 90.355 | 96.038 | 5.683 | 5.641 | 0.068 | 725 | 14 |
| 170-6 | MM | 730 | 90.355 | 95.968 | 5.613 | | | | |
| 170-7 | MM | 705 | 90,355 | 95.914 | 5.559 | | | | |
| 170-8 | MM | 735 | 90.355 | 96.064 | 5.709 | | | | |
| 170-9 | MP | 730 | 89.199 | 94.661 | 5.462 | 5.526 | 0.087 | 750 | 23 |
| 170-10 | MP | 730 | 89.199 | 94.640 | 5.441 | | | | |
| 170-11 | MP | 770 | 89.199 | 94.795 | 5.596 | | | | |
| 170-12 | MP | 770 | 89.199 | 94.804 | 5.605 | | | | |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

In certain example embodiments of this invention, there is provided a method of making a coated article including an anti-reflection coating on a glass substrate, the method comprising: forming a first sol formulation comprising a colloidal solution including a tri-alkoxysilane based binder; forming a second sol formulation comprising a colloidal solution including a tetra-alkoxysilane based binder; blending the first and second sol formulations to form a coating sol formulation; coating at least a portion of said coating sol formulation onto the glass substrate to form a coating; and heating said glass substrate and said coating.

In the method of the immediately preceding paragraph, curing the coating may be performed via said heating.

In the method of any of the preceding two paragraphs, the alkyltrialkoxysilane-based binder in the first sol formulation may comprise the formula (I):

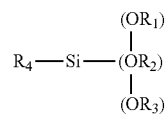

wherein $R_1$, $R_2$, and $R_3$ are the same or different and each represents an alkyl group containing 1 to 20 carbon atoms, an aryl group containing 6 to 20 carbon atoms, or an aralkyl group containing 7 to 20 carbon atoms; wherein $R_4$ represents an alkyl group containing 1 to 20 carbon atoms, an aryl group containing 6 to 20 carbon atoms, an aralkyl group containing 7 to 20 carbon atoms, or a fluoro-modified alkyl group containing 1 to 20 carbon atoms.

In the method of any of the preceding three paragraphs, the first sol formulation may comprise silica based nanoparticles, wherein a mass ratio of the alkyltrialkoxysilane-based binder to the silica based nanoparticles in the first sol formulation is between 0.1:1 to 20:1.

In the method of any of the preceding four paragraphs, the alkyltrialkoxysilane-based binder may comprise from about 10 wt. % to about 80 wt. % ash contribution in the total ash content of the first sol-formulation.

In the method of any of the preceding five paragraphs, the alkyltrialkoxysilane-based binder may be selected from the group consisting of n-propyltriethoxysilane, n-pentyltriethoxysilane, n-hexyltriethoxysilane, cyclohexyltrimethoxysilane, and combinations thereof.

In the method of any of the preceding six paragraphs, the method may comprise forming a gel on the glass substrate by drying the coating sol formulation coated on the glass substrate prior to annealing the coated glass substrate.

In the method of any of the preceding seven paragraphs, silica based nanoparticles in each of the first sol formulation, second sol formulation, and coating sol formulation may have a shape selected from spherical, elongated, disc-shaped, and combinations thereof.

In the method of any of the preceding eight paragraphs, silica based nanoparticles in each of the first sol formulation, second sol formulation, and coating sol formulation may be selected from spherical particles having a particle size from about 40 to 50 nm, spherical particles having a particle size from about 70 to 100 nm, spherical particles having a particle size from about 10 to 15 nm, spherical particles having a particle size from about 17 to 23 nm, elongated particles having a diameter from 9 to 15 nm and length of 40 to 100 nm, and combinations thereof.

In the method of any of the preceding nine paragraphs, the first and/or second sol formulation may further comprise an alcohol containing solvent and an acid or base containing catalyst.

In the method of any of the preceding ten paragraphs, the amount of tetra-alkoxysilane may be at least about 20% by weight of said second sol formulation and/or of said coating sol formulation.

In the method of any of the preceding eleven paragraphs, said glass substrate may be a matte-matte glass and/or a soda-lime-silica based float glass substrate.

In the method of any of the preceding twelve paragraphs, said coating step may comprise spin coating and/or dip coating.

In the method of any of the preceding thirteen paragraphs, the thickness of said coating after curing may be from about 120 to 140 nm.

In the method of any of the preceding fourteen paragraphs, refractive index of said coating following curing may be from about 1.2 to 1.3.

In the method of any of the preceding fifteen paragraphs, said heating may comprise heating the coated glass substrate at temperature(s) of at least about 580 degrees C. for a period of at least about 1 minute.

In the method of any of the preceding sixteen paragraphs, each of said first, second, and third sol formulations may further include one, two or all three of water, acetic acid and n-propyl alcohol.

In the method of any of the preceding seventeen paragraphs, said blending may comprise providing more of the second sol formulation than the first sol formulation in the coating sol formulation.

In the method of any of the preceding eighteen paragraphs, said coating sol formulation may comprise by weight from about 60-80% (more preferably from about 65-75%) of the second sol formulation and from about 20-40% (more preferably from about 25-35%) of the first sol formulation.

In the method of any of the preceding nineteen paragraphs, said second sol formulation may comprise colloidal silica in at least one solvent.

In the method of any of the preceding twenty paragraphs, the tetra-alkoxysilane based binder of the second sol formulation may be of or include TEOS.

In the method of any of the preceding twenty-one paragraphs, the coating may be applied directly or indirectly on the glass substrate (i.e., there may or may not be another layer(s) between the glass and the coating).

In the method of any of the preceding twenty-two paragraphs, the method may further include aging (e.g., for at least about 5 days, more preferably from about 5-25 days) said coating sol formulation prior to said step of coating.

In the method of any of the preceding twenty three paragraphs, visible transmittance and can be increased by at least about 2.8% as a result of said coating being applied on the substrate, more preferably by at least about 3%.

In the method of any of the preceding twenty four paragraphs, the thickness of said coating may be from about 122 to 133 nm.

In the method of any of the preceding twenty five paragraphs, a refractive index (n) of said coated article following curing may be from about 1.2 to 1.3, more preferably from about 1.21 to 1.27.

In the method of any of the preceding twenty six paragraphs, an increased amount of tetra-alkoxysilane in said mixture can increase the crosslinked density of said coating following said curing, thereby improving durability of the AR coating.

In the method of any of the preceding twenty seven paragraphs, curing said coating comprising tri-alkoxysilane and tetra-alkoxysilane may result in an anti-reflection coating on said glass substrate having small pores and a low overall porosity.

In the method of any of the preceding twenty eight paragraphs, curing said coating following said coating step may occur at temperature(s) of at least about 580 degrees C., more preferably at least about 600 degrees C., or most preferably at least about 620 degrees C., for a period of at least about 1 minute, more preferably at least about 2 minutes, and most preferably at least about 3 or 3.5 minutes.

In the method of any of the preceding twenty nine paragraphs, said first and second sol formulations may contain about 7% (more preferably at least about 9%) by weight silicon oxide nanoparticles. The second sol formulation may contain a greater percentage (e.g., at least 4% more) of nanoparticles than the first sol formulation.

In the method of any of the preceding thirty paragraphs, the first sol formulation is aged at least one day (e.g., from about 1-30 days) before said blending.

In the method of any of the preceding thirty one paragraphs, the second sol formulation is aged at least one day (e.g., from about 1-30 days) before said blending.

The invention claimed is:

1. A method of making a coated article including an anti-reflection coating on a glass substrate, the method comprising:
    forming a first sol formulation comprising a colloidal solution including a tri-alkoxysilane based binder and silica based nanoparticles;
    forming a second sol formulation comprising a colloidal solution including a tetra-alkoxysilane based binder and silica based nanoparticles, wherein the second sol formulation comprises a greater percentage by weight of silica nanoparticles than the first sol formulation;

blending the first sol formulation and the second sol formulation to form a coating sol formulation, the first sol formulation and/or the second sol formulation being aged for more than one day prior to said blending;

coating at least a portion of said coating sol formulation onto the glass substrate to form a coating; and heating said glass substrate and said coating, wherein visible transmittance is increased by at least 2.8% as a result of said coating being applied on the glass substrate, and wherein said coating has a refractive index, following said heating, of from about 1.2 to 1.3.

2. A method according to claim 1, comprising curing the coating via at least said heating.

3. A method according to claim 1, wherein the tri-alkoxysilane-based binder in the first sol formulation comprises the formula:

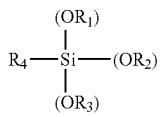

wherein $R_1$, $R_2$, and $R_3$ are the same or different and each represents an alkyl group containing 1 to 20 carbon atoms, an aryl group containing 6 to 20 carbon atoms, or an aralkyl group containing 7 to 20 carbon atoms; and wherein $R_4$ represents an alkyl group containing 1 to 20 carbon atoms, an aryl group containing 6 to 20 carbon atoms, an aralkyl group containing 7 to 20 carbon atoms, or a fluoro-modified alkyl group containing 1 to 20 carbon atoms.

4. A method according to claim 1, wherein a mass ratio of the tri-alkoxysilane-based binder to the silica based nanoparticles in the first sol formulation is between 0.1:1 to 20:1.

5. The method of claim 1, wherein the tri-alkoxysilane-based binder comprises from about 10 wt. % to about 80 wt. % ash contribution in the total ash content of the first sol-formulation.

6. The method of claim 1, wherein the tri-alkoxysilane-based binder is selected from the group consisting of n-propyltriethoxysilane, n-pentyltriethoxysilane, n-hexyltriethoxysilane, cyclohexyltrimethoxysilane, and combinations thereof.

7. The method of claim 1, wherein the tri-alkoxysilane-based binder comprises cyclohexyltrimethoxysilane.

8. The method of claim 1, comprising forming a gel on the glass substrate by drying the coating sol formulation coated on the glass substrate prior to heating the coated glass substrate.

9. The method of claim 1, wherein silica based nanoparticles in each of the first sol formulation, second sol formulation, and coating sol formulation have a shape selected from spherical, elongated, disc-shaped, and combinations thereof.

10. The method of claim 1, wherein silica based nanoparticles in each of the first sol formulation, second sol formulation, and coating sol formulation are selected from spherical particles having a particle size from about 40 to 50 nm, spherical particles having a particle size from about 70 to 100 nm, spherical particles having a particle size from about 10 to 15 nm, spherical particles having a particle size from about 17 to 23 nm, elongated particles having a diameter from 9 to 15 nm and length of 40 to 100 nm, and combinations thereof.

11. The method of claim 1, wherein the first sol formulation further comprises an alcohol containing solvent, and an acid or base containing catalyst.

12. A method according to claim 1, wherein the amount of tetra-alkoxysilane in the second sol formulation is at least 20% by weight of said second sol formulation.

13. A method according to claim 1, wherein the amount of tetra-alkoxysilane in the coating sol formulation is at least 20% by weight of said coating sol formulation.

14. A method according to claim 1, wherein said glass substrate is a matte-matte glass.

15. A method according to claim 1, wherein said glass substrate comprises soda-lime-silica based float glass.

16. A method according to claim 1, wherein said coating step comprises spin coating or dip coating.

17. A method according to claim 1, wherein the thickness of said coating after curing is from about 120 to 140 nm.

18. A method according to claim 1, wherein said heating comprising heating the coated glass substrate at temperature(s) of at least 580 degrees C. for a period of at least about 1 minute.

19. The method of claim 1, wherein each of said first, second, and coating sol formulations further include water, acetic acid and n-propyl alcohol.

20. The method of claim 1, wherein said blending comprises providing more of the second sol formulation than the first sol formulation in the coating sol formulation.

21. The method of claim 1, wherein said coating sol formulation comprises by weight from about 60-80% of the second sol formulation and from about 20-40% of the first sol formulation.

22. The method of claim 1, wherein the second sol formulation contains at least about 4 wt. % or more silica based nanoparticles than the first sol formulation.

23. The method of claim 1, wherein the tetra-alkoxysilane based binder of the second sol formulation comprises TEOS.

24. The method of claim 1, wherein the second sol formulation further comprises an alcohol containing solvent, and an acid or base containing catalyst.

25. The method of claim 1, wherein the coating is applied directly on the glass substrate.

26. The method of claim 1, wherein the first sol and/or second sol formulation(s) is/are aged for more than one day and less than or equal to thirty days before said blending.

27. A method of making a coated article including an anti-reflection coating on a glass substrate, the method comprising:

blending together a first sol formulation and a second sol formulation to form a coating sol formulation,
the first sol formulation and/or the second sol formulation each being aged for more than one day prior to said blending,
the first sol formulation comprising a colloidal solution including a tri-alkoxysilane based binder and silica based nanoparticles and
the second sol formulation comprising a colloidal solution including a tetra-alkoxysilane based binder and silica based nanoparticles,
wherein the second sol formulation comprises a greater percentage by weight of silica based nanoparticle than the first sol formulation;

applying at least a portion of said coating sol formulation onto the glass substrate to form an intermediate coating; and heating said glass substrate and said intermediate coating in forming the anti-reflection coating.

28. The method of claim 27,
wherein visible transmittance is increased by at least 3% as a result of said coating being applied on the glass substrate, and
wherein said coating has a refractive index, following said heating, of from about 1.21 to 1.27.

29. A method of making a coated article including an anti-reflection coating on a glass substrate, the method comprising:
  forming a first sol formulation comprising a colloidal solution including a tri-alkoxysilane based binder and silica based nanoparticles;
  forming a second sol formulation comprising a colloidal solution including a tetra-alkoxysilane based binder and silica based nanoparticles, wherein the second sol formulation comprises a greater per by weight of silica based nanoparticles than the first sol formulation;
  blending the first sol formulation and the second sol formulation to form a coating sol formulation;
  coating at least a portion of said coating sol formulation onto the glass substrate to form a coating; and
  heating said glass substrate and said coating,
  wherein visible transmittance is increased by at least 2.8% as a result of said coating being applied on the glass substrate.

* * * * *